(12) United States Patent
Lai

(10) Patent No.: US 9,042,489 B2
(45) Date of Patent: May 26, 2015

(54) CARRIER FREQUENCY OFFSET COMPENSATION APPARATUS AND ASSOCIATED METHOD

(71) Applicant: MStar Semiconductor, Inc., Hsinchu County (TW)

(72) Inventor: Ko-Yin Lai, Hsinchu County (TW)

(73) Assignee: MSTAR SEMICONDUCTOR, INC., Hsinchu County (TW)

( * ) Notice: Subject to any disclaimer, the term of this patent is extended or adjusted under 35 U.S.C. 154(b) by 23 days.

(21) Appl. No.: 14/096,132

(22) Filed: Dec. 4, 2013

(65) Prior Publication Data

US 2014/0179254 A1    Jun. 26, 2014

(30) Foreign Application Priority Data

Dec. 26, 2012  (TW) .............................. 101150171 A

(51) Int. Cl.
*H04L 27/00* (2006.01)

(52) U.S. Cl.
CPC ..... *H04L 27/0014* (2013.01); *H04L 2027/0026* (2013.01); *H04L 2027/0032* (2013.01); *H04L 2027/0053* (2013.01); *H04L 2027/0065* (2013.01); *H04L 2027/0079* (2013.01)

(58) Field of Classification Search
CPC ................... H04L 27/0014; H04L 2027/0026; H04L 2027/0032; H04L 2027/0053
USPC ................. 375/326, 344; 455/226.1, 296, 311
See application file for complete search history.

(56) References Cited

U.S. PATENT DOCUMENTS

| 5,963,856 | A | * | 10/1999 | Kim ............................... 455/307 |
| 5,995,563 | A | * | 11/1999 | Ben-Efraim et al. ......... 375/344 |
| 6,023,491 | A | * | 2/2000 | Saka et al. ..................... 375/326 |
| 6,192,088 | B1 | * | 2/2001 | Aman et al. ................... 375/326 |
| 7,302,013 | B2 | * | 11/2007 | Samueli et al. ................ 375/316 |
| 7,577,219 | B2 | * | 8/2009 | Oishi et al. ..................... 375/344 |
| 8,655,663 | B2 | * | 2/2014 | Matsuoka et al. ............. 704/265 |
| 2002/0136329 | A1 | * | 9/2002 | Liu et al. ........................ 375/326 |
| 2006/0203929 | A1 | * | 9/2006 | Kwak et al. .................... 375/270 |
| 2010/0296002 | A1 |   | 11/2010 | Cheng et al. |
| 2011/0002422 | A1 |   | 1/2011 | Cheng et al. |
| 2011/0129045 | A1 | * | 6/2011 | Tseng ............................. 375/344 |
| 2011/0188611 | A1 |   | 8/2011 | Chuang et al. |
| 2012/0314820 | A1 | * | 12/2012 | Kang et al. .................... 375/344 |

* cited by examiner

*Primary Examiner* — Duc M Nguyen
(74) *Attorney, Agent, or Firm* — WPAT, PC; Justin King

(57) ABSTRACT

A carrier frequency offset compensation method for a communication system is provided. The method includes: mixing, filtering and interpolating an input signal according to a mixing parameter, a first filtering parameter and a first interpolation parameter, respectively, to generate a processed result; calculating a carrier frequency offset estimation value of the input signal according to the processed result; adjusting the mixing parameter according to the carrier frequency offset estimation value; and mixing, filtering and interpolating the input signal according to the adjusted mixing parameter, a second filtering parameter and a second interpolation parameter, respectively. The first interpolation parameter is associated with a cut-off frequency corresponding to the first filtering parameter.

17 Claims, 2 Drawing Sheets

CARRIER FREQUENCY OFFSET COMPENSATION APPARATUS AND ASSOCIATED METHOD

This application claims the benefit of Taiwan application Serial No. 101150171, filed Dec. 26, 2012, the subject matter of which is incorporated herein by reference.

BACKGROUND OF THE INVENTION

1. Field of the Invention

The invention relates in general to a carrier frequency offset (CFO) compensation apparatus and associated method, and more particularly to carrier frequency offset compensation apparatus and associated method for a wireless communication system.

2. Description of the Related Art

In a wireless communication system, a transmission end modulates a signal to be transmitted, up-converts the modulated signal to a radio-frequency (RF) signal, and transmits the RF signal. A reception end receives the RF signal via an antenna, down-converts the RF signal to a baseband signal, and demodulates the baseband signal. Due to a difference between an oscillation frequency for up-conversion at the transmission end and an oscillation frequency for down-conversion at the reception end, an issue of carrier frequency offset in the down-converted signal at the reception end is caused. Such issue adds complications to the demodulation process and also results in an increased transmission bit error rate of the wireless communication system.

Therefore, a wireless communication system usually includes a carrier frequency offset estimation and compensation apparatus for solving the carrier frequency offset. For example, the US Patent Publication 2011/0188611 A1 discloses "Signal Processing Circuit and Method Thereof", the US Patent Publication 2010/0296002 A1 discloses "Circuit for Detecting a Digital Data Stream and Associated Method", and the US Patent Publication 2011/0002422 A1 discloses "Apparatus for Detecting Digital Video Signal Parameters and Method Thereof". However, in certain communication systems, e.g., a Digital Video Broadcasting-Satellite (DVB-S) communication system, the carrier frequency offset is more severe compared to other communication systems. More particularly, with a low signal-to-noise ratio (SNR), the carrier frequency offset can be aggravated. Therefore, there is a need for a solution for solving the above issue.

SUMMARY OF THE INVENTION

The invention is directed to a carrier frequency offset compensation apparatus and associated method for solving issues of the prior art.

The present invention discloses a carrier frequency offset (CFO) compensation method for a communication system. The method includes: mixing, filtering and interpolating an input signal according to a mixing parameter, a first filtering parameter and a first interpolation parameter, respectively, to generate a processed result; calculating a carrier frequency offset estimation value of the input signal according to the processed result; adjusting the mixing parameter according to the carrier frequency offset estimation value; and mixing, filtering and interpolating the input signal according to the adjusted mixing parameter, a second filtering parameter and a second interpolation parameter, respectively. The first interpolation parameter is associated with a cut-off frequency corresponding to the first filtering parameter.

The present invention further discloses a carrier frequency offset compensation apparatus for a communication system. The apparatus includes: a mixer, configured to mix an input signal to generate a frequency shifted signal; a filter, configured to filter the frequency shifted signal to generate a filtered signal; an interpolator, configured to interpolate the filtered signal to generate an output signal; a carrier frequency offset estimator, configured to generate a carrier frequency offset estimation value according to the output signal; and a controller, configured to control the filter and the interpolator to operate according to the a first filtering parameter and a first interpolation parameter, respectively, when the carrier frequency offset estimation value is being estimated, adjust a mixing parameter of the mixer according to the carrier frequency offset estimation value after having estimated the carrier frequency offset estimation value, and control the filter and the interpolator to operate according to a second filtering parameter and a second interpolation parameter, respectively. The first interpolation parameter is associated with a cut-off frequency corresponding to the first filtering parameter.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
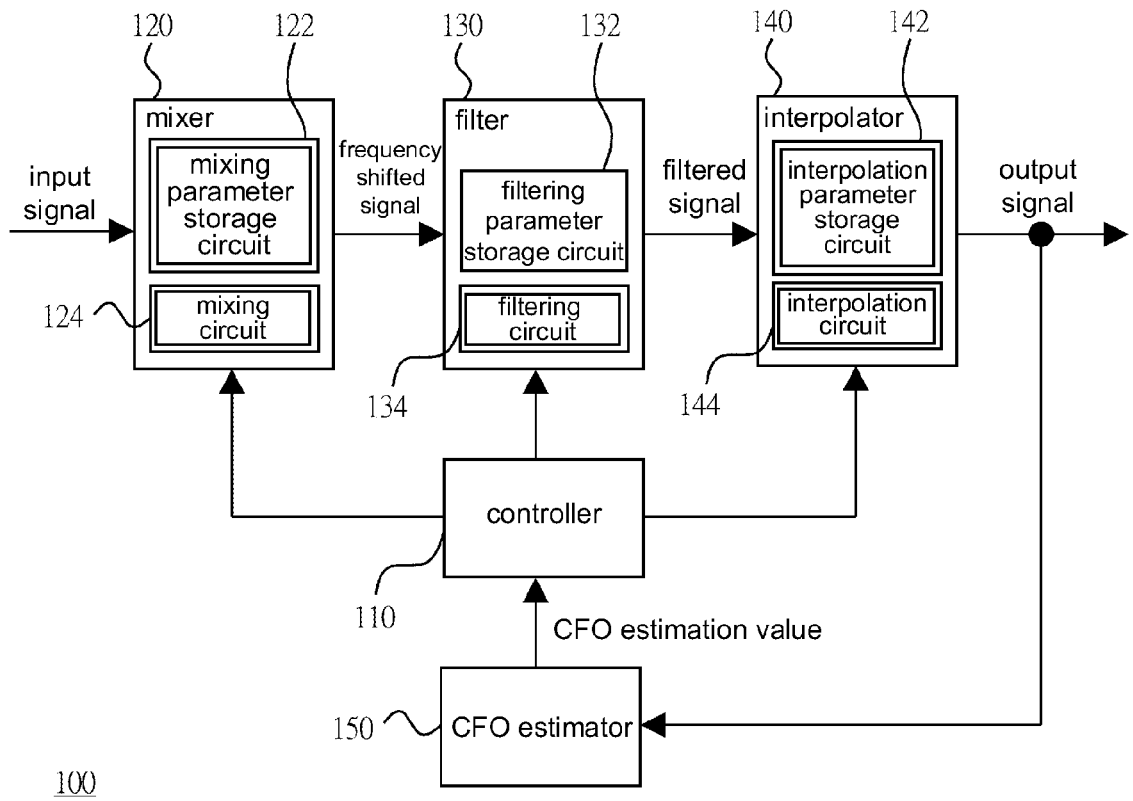
FIG. 1 is a schematic diagram of a carrier frequency offset compensation apparatus according to an embodiment of the present invention.

Technical terms of the application are based on general definition in the technical field of the application. If the application describes or explains one or some terms, definition of the terms are based on the description or explanation of the application. In possible implementation, in the application, the relationship between objects or events includes a direct relationship or an indirect relationship. The indirect relationship refers to that there are intermediate objects or space between the objects or there are intermediate events or timing period between the events. The disclosure below relates to a carrier frequency offset compensation apparatus and associated method, and details of techniques or principles of the prior art, if not pertaining to technical features of the present invention, are omitted herein. Further, shapes, sizes and ratios of the objects are exemplary for one skilled person in the art to understand the application, not to limit the application.

Each of the disclosed embodiments has one or more technical features. However, it does not mean that implementation of the application needs every technical feature of any embodiment of the application or combination of the embodiments of the application is prohibited. In other words, in possible implementation, one skilled person in the art would selectively implement part or all technical features of any embodiment of the application or selectively combine part or all technical features of the embodiments of the application based on the disclosure of the application and his/her own need. Implementation of the application is flexible.

A carrier frequency offset compensation apparatus and associated method are disclosed by the present invention. The carrier frequency offset compensation apparatus and associated method are applicable to a demodulator in a communication system, and are capable of assisting the demodulator in a low SNR environment to achieve an equivalent effect of a high SNR environment. For example, the demodulator may be a demodulator in a Digital Video Broadcasting-Satellite (DVB-S) system. The above example is for explaining the present invention to a person having ordinary skill in the art, not limiting the present invention. In possible implementation, a person having ordinary skill in the art may choose equivalent elements or steps for realizing the present invention according to the details of the disclosure. That is, the embodiments are not limited to the embodiments disclosed in the specification. Further, as a part or all of the elements of the carrier frequency offset apparatus are individually known elements, without affecting the full disclosure and possible implementation of the carrier frequency offset apparatus, details associated with the individual elements for realizing the carrier frequency offset apparatus are omitted. The carrier frequency offset method of the present invention may be implemented by the carrier frequency offset apparatus of the present invention, or other carrier frequency offset apparatuses. Similarly, without affecting the full disclosure and possible implementation of the method, details associated with hardware for performing the method are omitted.

FIG. 1 shows a schematic diagram of a carrier frequency offset compensation apparatus according to an embodiment of the present invention. The embodiment is applicable to a demodulator (e.g., a demodulator of a DVB-S system), or other apparatuses that need a carrier frequency offset compensation function. Referring to FIG. 1, a carrier frequency offset compensation apparatus 100 includes a controller 110, a mixer 120, a filter 130, an interpolator 140, and a carrier frequency offset estimator 150. For example, the controller 110 is a micro control unit (MCU), a programmable logic controller (PLC) or a circuit that can perform functions of the controller of the present invention. The mixer 120 generates a frequency shifted signal according to an input signal, and includes a mixing parameter storage circuit 122 (e.g., a buffer) and a mixing circuit 124 (e.g., an up-conversion and/or a down-conversion circuit). The mixing parameter storage circuit 122, coupled to the controller 110, stores at least one mixing parameter. The mixing circuit 124, coupled to the mixing parameter storage circuit 122, shifts the frequency of the input signal according to at least one mixing parameter to generate the frequency shifted signal. The filter 130 includes a filtering parameter storage circuit 132 (e.g., a buffer) and a filtering circuit 134 (e.g., a low-pass filtering circuit). The filtering parameter storage circuit 132, coupled to the controller 110, stores at least one filtering parameter. The filtering circuit 134, coupled to the filtering parameter storage circuit 132 and the mixer 120, filters the frequency shifted signal according to at least one filtering parameter to generate the filtered signal. The interpolator 140, coupled to the filter 130 and the controller 110, interpolates the filtered signal to generate an output signal, and includes an interpolation parameter storage circuit 142 (e.g., a buffer) and an interpolation circuit 144. The interpolation parameter storage circuit 142, coupled to the controller 110, stores at least one interpolation parameter. The interpolation circuit 144, coupled to the interpolation parameter storage circuit 142 and the filter 130, interpolates the filtered signal according to the at least one interpolation parameter to generate the output signal. The carrier frequency offset estimator 150, coupled to the interpolator 140 and the controller 110, generates at least one carrier frequency offset estimation value according to the output signal. The controller 110 updates the at least one mixing parameter according to the at least one carrier frequency offset estimation value to compensate the carrier frequency offset of the input signal, and updates the at least one filter parameter and the at least one interpolation parameter according to a normal operation setting. That is to say, during the process that the carrier frequency offset compensation apparatus 100 generates the carrier frequency offset estimation value, the controller 110 controls the filter 130 and the interpolator 140 to first operate according to a first filtering parameter and a first interpolation parameter, respectively. When the carrier frequency offset estimation value is obtained by the carrier frequency offset estimator 150, the carrier frequency offset compensation apparatus 100 performs a normal operation, such that the controller 110 adjusts the mixing parameter of the mixer 120 according to the carrier frequency offset estimation value obtained by the controller 110. The controller 110 further updates the first filtering parameter and the first interpolation parameter according to the normal operation setting, so that the filter 130 and the interpolator 140 operate according to a second filtering parameter and a second interpolation parameter, respectively.

In the embodiment, when the carrier frequency offset compensation apparatus 100 is activated and/or encounters a change in a transmission end (e.g., when a transmission end switches to another satellite due to channel switching), the mixer 120 first down-converts the input signal according to a mixing parameter to generate the frequency shifted signal. At this point, the frequency shifted signal has a carrier frequency offset to be compensated. The filter 130 then filters the frequency shifted signal according to the first filtering parameter to generate the filtered signal. At this point, the first filtering parameter includes a signal bandwidth factor, a roll-off effect estimation factor and a carrier frequency offset estimation factor. More specifically, when estimating the carrier frequency offset that is not yet appropriate compensated, to prevent the filter 130 from filtering out signals required for demodulation, the roll-off effect and a possible carrier frequency offset magnitude are taken into consideration when designing the first filtering parameter, so as to appropriately set a filtering bandwidth of the filter 130 to a greater range. In practice, different types of input signals inputted into different types of reception ends may correspond to different signal bandwidth factors, roll-off effect estimation factors and carrier frequency offset estimation factors. The carrier frequency offset estimation factor may be estimated according to the carrier frequency adopted by the communication system and an acceptable offset of the system. For example, the bandwidth corresponding to the signal bandwidth factor is equal to a symbol rate of 10 MHz of the input signal, the bandwidth corresponding to the roll-off effect estimation factor is 3.5 MHz (i.e., assuming that a roll-off parameter a is 0.175), and the bandwidth corresponding to the carrier frequency offset estimation factor is 10 MHz (i.e., assuming that an estimated frequency offset $CFO_{Estimation}$ at a low-frequency side and at a high-frequency side is 5 MHz, respectively). According to the embodiment, the filtering bandwidth (or referred to as an estimation bandwidth $BW_{Estimation}$) of the filter 130 may be set to 23.5 MHz, a sum of the bandwidths corresponding to the above factors, and is mathematically represented as $BW_{Estimation}=SR\times(1+2\alpha)+2\times CFO_{Estimation}=10\times(1+2\times 0.175)+2\times 5=23.5$ MHz. Such bandwidth adopted by the filter 130 is greater than the symbol rate 10 MHz of the input signal, and so the possibility of missing signals is minimized although the signals are shifted.

After the filter 130 generates the filtered signal, the interpolator 140 interpolates the filtered signal according to the first interpolation parameter to generate the output signal. At this point, the first interpolation parameter is associated with a cut-off frequency (i.e., a frequency of the filtered signal at 3 dB) corresponding to the first filtering parameter. More specifically, at this point, an output speed of the interpolator 140 is equal to the value of 23.5 MHz, the bandwidth of the filter 130. Associated details are to be described shortly. The carrier frequency offset estimator 150 then calculates the carrier frequency offset estimation value according to the output signal generated by the interpolator 140. More specifically, the carrier frequency offset estimator 150 calculates a plurality of estimation values according to the output signal at a plurality of time points (e.g., 1000 time points), and averages the estimation values to obtain the carrier frequency offset estimation value. Next, the controller 110 reads the carrier frequency offset estimation value from the carrier frequency offset estimator 150 to update the mixing parameter and to accordingly compensate the carrier frequency offset. Given the carrier frequency offset estimation value is obtained, the controller 110 updates the first filtering parameter and the first interpolation parameter according to the foregoing normal operation setting. That is to say, at this point, the controller 110 controls the filter 130 to filter the frequency shifted signal according to the second filtering parameter, and controls the interpolator 140 to interpolate the filtered signal according to the second interpolation parameter. The second filtering parameter is different from the first filtering parameter, and is associated with the symbol rate of the input signal. For example, the controller 110 renders the filtering bandwidth corresponding to the second filtering parameter to equal to the symbol rate 10 MHz of the input signal according to the normal operation setting, and renders the output speed of the interpolator 140 corresponding to the second interpolation parameter to be twice the symbol rate, i.e., 20 MHz. In other words, according to the normal operation, the controller 110 updates the first filtering parameter to the second filtering parameter, and updates the first interpolation parameter to the second interpolation parameter, so that the filtering bandwidth (i.e., a normal bandwidth) of the filter 130 is equal to the symbol rate of the input signal, i.e., 10 MHz, and the output speed (i.e., a normal speed) of the interpolator 140 is equal to twice the symbol rate, i.e., 20 MHz. In the normal operation, as the controller 110 has already updated the mixing parameter according to the carrier frequency offset estimation value, the symbol rate 10 MHz of the input signal may be directly utilized as the filtering bandwidth of the filter 130. Further, the output speed of the interpolator 140 in the normal operation is determined according to the system utilizing the carrier frequency offset compensation apparatus 100, and is not directly associated with the second filtering parameter. For example, in the embodiment, the output speed is twice of the symbol rate of the input signal, i.e., 20 MHz.

It should be noted that, the above embodiment is for explaining the present invention, not limiting the present invention. A person having ordinary skill in the art may make appropriate modifications to the embodiment based on the disclosure of the present invention. For example, before obtaining the carrier frequency offset estimation value, the filtering parameter may include only the signal bandwidth factor and the carrier frequency offset estimation factor; the roll-off effect factor and the carrier frequency offset estimation factor may be adjusted according to design specifications or application requirements; the number of time points may be greater than or smaller than 1000; the output speed of the interpolator 140 may be not equal to the filtering bandwidth of the filter 130 before obtaining the carrier frequency offset estimation value, given that operation results are within acceptable ranges to a person implementing the embodiment; the plurality of estimation values may be jointly regarded as the carrier frequency offset estimation value and provided to the controller 110, so that the controller 110 performs an averaging calculation, a weighted calculation or another predetermined calculation to obtain a frequency offset value, according to which the controller 110 then adjusts the mixing parameter; the updated filtering parameter may take the roll-off effect into consideration so that the corresponding bandwidth is greater than the value of the symbol rate; and the updated interpolation parameter may render the corresponding output speed of the interpolator 140 to be greater than or smaller than twice of the symbol rate according to requirements. Further, as the mixer 120, the filter 130 and the interpolator 140 are individually known components, without affecting the full disclosure and possible implementation of the present invention, a person having ordinary skill art may select appropriate elements or combine elements into appropriate circuits for realizing the components, and so details associated with the individual components for realizing the present invention are omitted.

Figure 2:
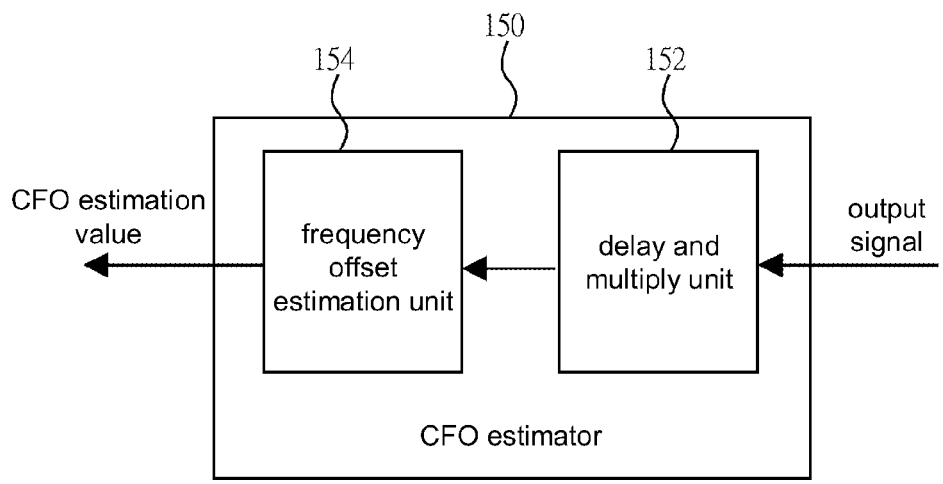
FIG. 2 is a schematic diagram of a carrier frequency offset estimator in FIG. 1 according to an embodiment of the present invention.

FIG. 2 is a schematic diagram of a carrier frequency offset estimator 150 in FIG. 1 according to an embodiment. Operation theories of the carrier frequency offset estimator 150 may be referred from a publication "Synchronization Techniques for Digital Receivers", by Umberto Mengali and Aldo N. D'Andrea, ISBN 0-306-45725-3, in Chapter 3.6, page 133 (to be referred to as reference document 1). Description associated with the technical features of the present invention is given below. As shown in FIG. 2, the carrier frequency offset estimator 150 includes a delay-and-multiply unit 152 (refer to the reference document 1 for details) and a frequency offset estimation unit 154 (refer to the reference document 1 for details). The delay-and-multiply unit 152, coupled to the interpolator 140, generates a calculated value (z(t)) according to an output signal (x(t)). According to the reference document 1, the calculated value is mathematically represented as: $z(t)=x(t)x^*(t-\Delta T)$, where t is the time, $x^*$ is a complex conjugate of x(t), $\Delta T$ is a delay time corresponding to the interpolation parameter of the interpolator 140. The frequency offset estimation unit 154 generates the carrier frequency offset ($f_{CFO}$) according to the calculated value. According to the reference document 1, the carrier frequency offset estimation value may be mathematically represented as: $f_{CFO}=(1/2\pi\Delta T)\arg\{\int z(t)dt\}$, where t is a value between 0 and $T_0$. After the frequency offset estimation unit 154 obtains the carrier frequency offset estimation value, the carrier frequency offset estimator 150 sends a signal to inform the controller 110. The controller 110 then reads the carrier frequency offset estimation value from the carrier frequency offset estimator 150, and accordingly updates the mixing parameter of the mixer 120 to compensate the carrier frequency offset of the input signal. When estimating the carrier frequency offset estimation value, to effectively reduce influences caused by noises in the output signal and to enhance the accuracy of the carrier frequency offset estimation, in the embodiment, the signal bandwidth factor, the roll-off effect estimation factor and the carrier frequency offset estimation factor are considered in the first filtering parameter, and the filtering bandwidth is accordingly determined. From the theories of the reference document 1, it is known that, when the delay time $\Delta T$ is set as an integral multiple of a reciprocal of twice the bandwidth occupied by the first filtering parameter from zero to the cut-off frequency (i.e., $\Delta T=k/(2BW_{Filter})$, where $BW_{Filter}$ is the bandwidth occupied by the first filtering parameter from zero to the cut-off frequency, and k is a positive integer), the foregoing setting renders a noise factor in the output signal to be zero, so that the carrier frequency offset estimator 150 may stay unaffected by the noise factor and is thus capable of more accurately calculating the carrier frequency offset estimation value. It should be noted that, in another embodiment, the foregoing delay time $\Delta T$ approximates $K/2BW_{Filter}$, e.g., within an interval of plus or minus $K/2BW_{Filter}$ by a range. The range may be determined by a person having ordinary skill in the art based on design tolerable ranges. In other words, the definition of the range may be determined according to whether the influences of the foregoing noise exceed design tolerable ranges. Further, the approach of the carrier frequency offset estimator is an example for illustrating the present invention, not limiting the present invention. Without affecting possible implementation of the present invention, other known theories or practices for carrier frequency offset estimation may be adopted in the present invention.

As previously described, in the present invention, before and after obtaining the carrier frequency offset estimation value, different filtering parameters and different interpolation parameters are assigned to the filter 130 and the interpolator 140, respectively. Thus, even in an environment with a low SNR, the present invention is nevertheless capable of achieving a substantially same effect as in an environment with a high SNR. In other words, an apparatus (e.g., a demodulator of a DVB-S system) employing the present invention is less sensitive to noises and thus achieves more stable performance.

Figure 3:
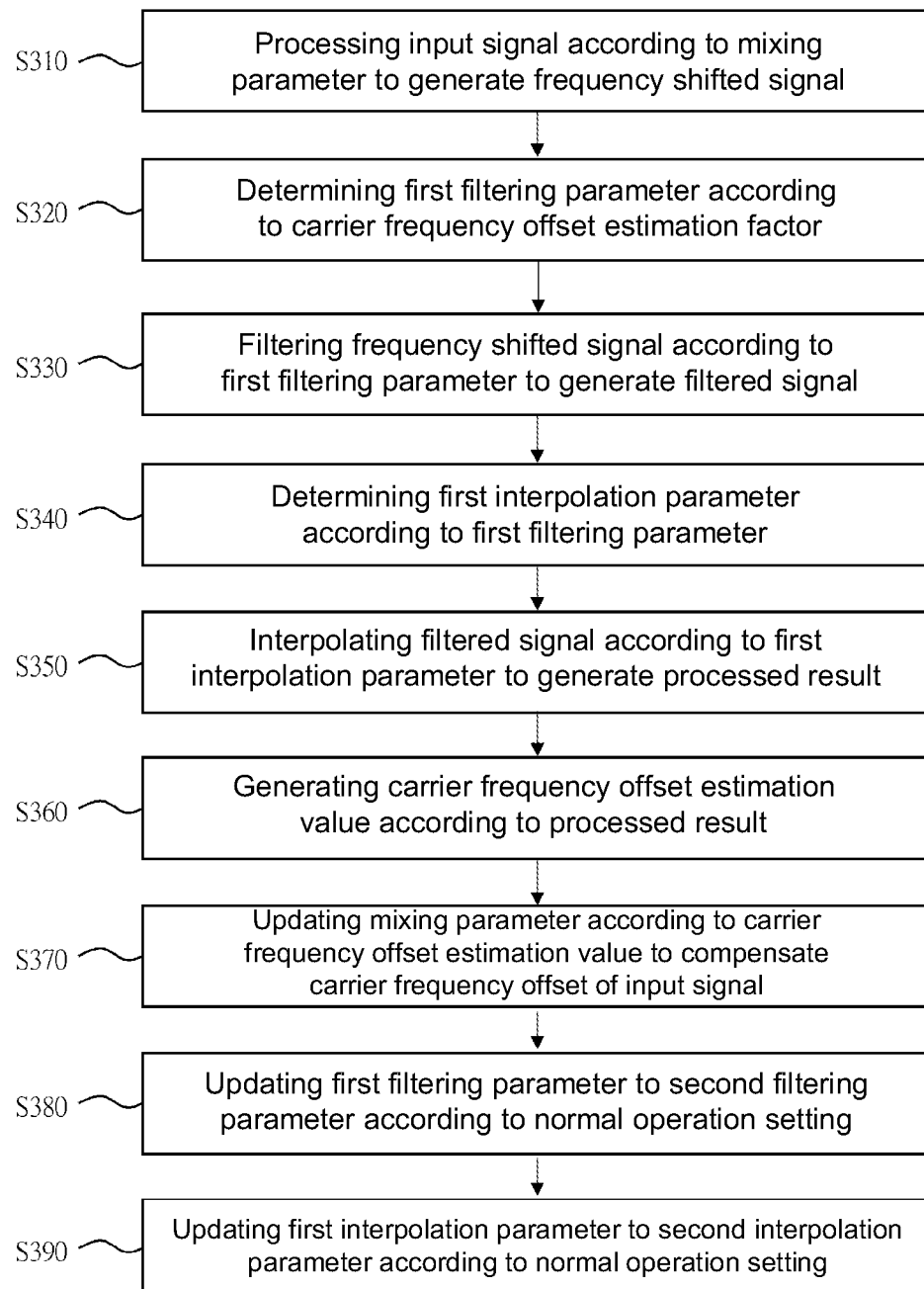
FIG. 3 is a flowchart of a carrier frequency offset compensation method according to an embodiment of the present invention

In addition to the above carrier frequency offset compensation apparatus 100, the present invention further discloses a carrier frequency offset compensation method for compensating a carrier frequency offset of an input signal. The method may be performed by the carrier frequency offset compensation apparatus 100 of the present invention, or other apparatuses capable of performing the method. Referring to FIG. 3, the method according to an embodiment includes the following steps.

In step S310, an input signal is processed according to at least one mixing parameter to generate a frequency shifted signal. Step S310 may be performed by a mixer (e.g., the mixer 120 in FIG. 1).

In step S320, a first filtering parameter is determined according to a carrier frequency offset estimation factor, which may be determined according to design specifications or application targets. In the embodiment, the first filtering parameter includes a signal bandwidth factor, a roll-off effect estimation factor and a carrier frequency offset estimation factor. Details of the factors may be referred from abovementioned description associated with the carrier frequency offset compensation apparatus 100.

In step S330, the frequency shifted signal is filtered according to the first filtering parameter to generate a filtered signal. Step S330 may be performed by a filter (e.g., the filter 130 in FIG. 1).

In step S340, a first interpolation parameter is determined according to the first filtering parameter. In the embodiment, an output speed of an interpolator corresponding to the first interpolation parameter is associated with a cut-off frequency corresponding to the first filtering parameter. More specifically, the output speed of the interpolator corresponding to the first interpolation parameter is the same as a filtering bandwidth corresponding to the first filtering parameter. Under different design considerations or requirements, the values corresponding to two parameters may be different.

In step S350, the filtered signal is interpolated according to the first interpolation parameter to generate a processed result. Step S350 may be performed by an interpolator (e.g., the interpolator 140 in FIG. 1).

In step S360, at least one carrier frequency offset estimation value is generated according to the processed result. Step S360 may be performed by a carrier frequency offset estimator (e.g., the carrier frequency offset estimator 150 in FIG. 1). Operation principles of this step may be referred from the abovementioned reference document 1.

In step S370, the mixing parameter is updated according to the carrier frequency offset estimation value to compensate the carrier frequency offset of the input signal. Step S370 may be performed by a controller (e.g., the controller 110 in FIG. 1) controlling the mixer that performs step S310.

In step S380, the first filtering parameter is updated to a second filtering parameter according to a normal operation setting. Step S380 may be performed by a controller (e.g., the controller 110 in FIG. 1) controlling the filter that performs step S330. In the embodiment, the bandwidth (i.e., a normal bandwidth) corresponding to the second filtering parameter is equal to a symbol rate of the input signal, and the bandwidth corresponding to the second filtering parameter is smaller than a bandwidth (i.e., an estimation bandwidth) corresponding to the first filtering parameter.

In step S390, the first interpolation parameter is updated to a second interpolation parameter according to the normal operation setting. Step S390 may be performed by a controller (e.g., the controller 110 in FIG. 1) controlling the interpolator that performs step S350. In the embodiment, an output speed (i.e., a normal speed) of the interpolator corresponding to the second interpolation parameter is equal to twice of the symbol rate of the input signal. Further, an output speed (i.e., an estimation speed) corresponding to the second interpolation parameter is determined according to a system employing the carrier frequency offset compensation apparatus 100, and is not directly associated with the filtering parameter. For example, in the embodiment, the output speed is twice of the symbol rate of the input signal.

It should be noted that, details of the carrier frequency offset compensation method in FIG. 3 can be thoroughly understand by a person having ordinary skill in the art with reference to the foregoing description associated with the carrier frequency offset compensation apparatus 100, and shall be omitted herein.

In conclusion, in the carrier frequency offset compensation apparatus and associated method disclosed by the present invention, before and after obtaining a carrier frequency offset estimation value, different filtering parameters and different interpolation parameters are assigned to a filter and an interpolator, respectively. As such, even in a low-SNR environment, the present invention is nevertheless capable of achieving a substantially same effect as in a high-SNR environment. In other words, by reducing the correlation between the SNR, the present invention allows an apparatus (e.g., a demodulator in a DVB-S system) employing the present invention to be less sensitive to changes in noises and thus achieve relatively stable performance.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A carrier frequency offset compensation method, applied to a communication system, comprising:
    mixing, filtering and interpolating an input signal according to a mixing parameter, a first filtering parameter and a first interpolation parameter, respectively, to generate a processed result;
    calculating a carrier frequency offset estimation value of the input signal according to the processed result;
    adjusting the mixing parameter according to the carrier frequency offset estimation value; and
    mixing, filtering and interpolating the input signal according to the adjusted mixing parameter, a second filtering parameter and a second interpolation parameter;
    wherein, the first interpolation parameter is associated with a cut-off frequency corresponding to the first filtering parameter.

2. The carrier frequency offset compensation method according to claim 1, wherein the first filtering parameter differs from the second filtering parameter.

3. The carrier frequency offset compensation method according to claim 2, wherein a bandwidth corresponding to the first filtering parameter is greater than a bandwidth corresponding to the second filtering parameter.

4. The carrier frequency offset compensation method according to claim 2, wherein a bandwidth of the second filtering parameter is associated with a symbol rate of the input signal.

5. The carrier frequency offset compensation method according to claim 1, wherein the second interpolation parameter is associated with a symbol rate of the input signal.

6. The carrier frequency offset compensation method according to claim 1, wherein the first filtering parameter comprises a signal bandwidth factor and a carrier frequency offset estimation factor.

7. The carrier frequency offset compensation method according to claim 6, wherein the second filtering parameter does not comprise the carrier frequency offset estimation factor.

8. The carrier frequency offset compensation method according to claim 6, wherein the first filtering parameter further comprises a roll-off effect estimation factor.

9. A carrier frequency offset compensation method, applied to a communication system, comprising:
    mixing, filtering and interpolating an input signal according to a mixing parameter, a first filtering parameter and a first interpolation parameter, respectively, to generate a processed result;
    calculating a carrier frequency offset estimation value of the input signal according to the processed result;
    adjusting the mixing parameter according to the carrier frequency offset estimation value; and
    mixing, filtering and interpolating the input signal according to the adjusted mixing parameter, a second filtering parameter and a second interpolation parameter;
    wherein, a bandwidth corresponding to the first filtering parameter is greater than a bandwidth corresponding to the second filtering parameter.

10. A carrier frequency offset compensation apparatus, applied to a communication system, comprising:
    a mixer, configured to mix an input signal to generate a frequency shifted signal;
    a filter, configured to filter the frequency shifted signal to generate a filtered signal;
    an interpolator, configured to interpolate the filtered signal to generate an output signal;
    a carrier frequency offset estimator, configured to generate a carrier frequency offset estimation value according to the output signal; and
    a controller, when estimating the carrier frequency offset estimation value, configured to control the filter and the interpolator to operate according to a first filtering parameter and a first interpolation parameter, respectively; and, after having estimated the carrier frequency offset estimation value, to adjust a mixing parameter of the mixer according to the carrier frequency offset estimation value, and to control the filter and the interpolator to operate according to a second filtering parameter and a second interpolation parameter, respectively;
    wherein, the first interpolation parameter is associated with a cut-off frequency corresponding to the first filtering parameter.

11. The carrier frequency offset compensation apparatus according to claim 10, wherein the first filtering parameter differs from the second filtering parameter.

12. The carrier frequency offset compensation apparatus according to claim 11, wherein a bandwidth corresponding to the first filtering parameter is greater than a bandwidth corresponding to the second filtering parameter.

13. The carrier frequency offset compensation apparatus according to claim 11, wherein a bandwidth of the second filtering parameter is associated with a symbol rate of the input signal.

14. The carrier frequency offset compensation apparatus according to claim 10, wherein the second interpolation parameter is associated with a symbol rate of the input signal.

15. The carrier frequency offset compensation apparatus according to claim 10, wherein the first filtering parameter comprises a signal bandwidth factor and a carrier frequency offset estimation factor.

16. The carrier frequency offset compensation apparatus according to claim 15, wherein the second filtering parameter does not comprise the carrier frequency offset estimation factor.

17. The carrier frequency offset compensation apparatus according to claim 15, wherein the first filtering parameter further comprises a roll-off effect estimation factor.

* * * * *